United States Patent
Inamura et al.

(10) Patent No.: US 9,294,734 B2
(45) Date of Patent: Mar. 22, 2016

(54) VIDEO SURVEILLANCE SYSTEM

(75) Inventors: Hiroyuki Inamura, Hachioji (JP); Masatoshi Suzuki, Fussa (JP); Kyosuke Dobashi, Higashimurayama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1711 days.

(21) Appl. No.: 11/709,731

(22) Filed: Feb. 23, 2007

(65) Prior Publication Data

US 2007/0204316 A1 Aug. 30, 2007

(30) Foreign Application Priority Data

Feb. 24, 2006 (JP) ................................. 2006-047754

(51) Int. Cl.
*H04N 7/18* (2006.01)
*H04L 12/725* (2013.01)
(Continued)

(52) U.S. Cl.
CPC ............ *H04N 7/181* (2013.01); *H04L 45/3065* (2013.01); *H04W 72/1242* (2013.01); *G08B 13/19656* (2013.01); *H04L 47/10* (2013.01); *H04L 47/14* (2013.01); *H04L 47/17* (2013.01); *H04L 67/12* (2013.01); *H04L 67/322* (2013.01); *H04W 24/00* (2013.01); *H04W 40/02* (2013.01); *H04W 40/28* (2013.01); *H04W 84/22* (2013.01); *H04W 88/16* (2013.01)

(58) Field of Classification Search
CPC ......... H04L 47/10; H04L 47/14; H04L 47/17; G08B 13/19656; H04W 24/00; H04N 7/185
USPC ........................................................ 348/143
See application file for complete search history.

(56) References Cited

U.S. PATENT DOCUMENTS 5,699,521 A * 12/1997 Iizuka et al. ................... 709/240
7,202,884 B1 * 4/2007 Barraclough .............. 348/14.01
(Continued)

FOREIGN PATENT DOCUMENTS

JP 2005-51412 2/2005
JP 2005-123887 5/2005

OTHER PUBLICATIONS

Molina Lopez, J.M.; Rodriguez, F.J.Jimenez; Corredera, J.R.Casar, "Fuzzy management of surveillance sensors," in Decision and Control, 1998. Proceedings of the 37th IEEE Conference on , vol. 1, No., pp. 245-250 vol. 1, 1998.*

(Continued)

*Primary Examiner* — Taylor Elfervig
(74) *Attorney, Agent, or Firm* — Finnegan, Henderson, Farabow, Garrett & Dunner, LLP (57) ABSTRACT

A video surveillance system wherein a monitoring station collects video data obtained by a monitoring camera is disclosed. The system includes a multihop wireless network formed of a plurality of wireless nodes including a first wireless node having the monitoring camera, and a second wireless node having a gateway connected to the monitoring station. The system also includes a priority control device configured to control the wireless network so that transmission in a link between the first wireless node and the second wireless node is performed at a priority level contained in a priority information message. The transmission including transmitting a video data request from the monitoring station to the monitoring camera, or transmitting video data from the monitoring camera to the monitoring station.

23 Claims, 7 Drawing Sheets

(51) Int. Cl.
 *H04W 72/12* (2009.01)
 *H04L 12/801* (2013.01)
 *G08B 13/196* (2006.01)
 *H04W 24/00* (2009.01)
 *H04W 40/02* (2009.01)
 *H04W 40/28* (2009.01)
 *H04W 84/22* (2009.01)
 *H04W 88/16* (2009.01)
 *H04L 29/08* (2006.01)

(56) References Cited

U.S. PATENT DOCUMENTS

2005/0226463 A1* 10/2005 Suzuki et al. ............... 382/103
2006/0098593 A1* 5/2006 Edvardsen et al. .......... 370/328
2007/0038743 A1* 2/2007 Hellhake et al. ............. 709/224

OTHER PUBLICATIONS

Molina Lopez, J.M.; Jimenez Rodriguez, S.J.; Corredera, J.R.Casar, "Fuzzy reasoning for multisensor management," in Systems, Man and Cybernetics, 1995. Intelligent Systems for the 21st Century., IEEE International Conference on , vol. 2, No., pp. 1398-1403 vol. 2, Oct. 22-25, 1995.*

Ramamritham, K.; Arya, K.; Fohler, G., "System software for embedded applications," in VLSI Design, 2004. Proceedings. 17th International Conference on , vol., No., pp. 12-14, 2004.*

Goradia, A.; Ning Xi; Prokos, M.; Zhiwei Cen; Mutka, M., "Cooperative multi-target surveillance using a mutational analysis approach," in Advanced Intelligent Mechatronics. Proceedings, 2005 IEEE/ASME International Conference on , vol., No., pp. 940-945, Jul. 24-28, 2005.*

* cited by examiner

Example of holding information table of each node

| | Source address | Sending destination address | Priority | Reservation band | Effective band | Last hop node address | Next hop node address | Node status |
|---|---|---|---|---|---|---|---|---|
| Link 1 | 192.168.0.7 | 192.168.0.1 | 5 | 3Mbps | 1.5Mbps | 192.168.0.3 | 192.168.0.5 | Relay |
| Link 2 | 192.168.0.8 | 192.168.0.1 | 1 | 1Mbps | 1Mbps | None | None | None |
| .. | .. | .. | | | | | | |

F I G. 7

VIDEO SURVEILLANCE SYSTEM

CROSS-REFERENCE TO RELATED APPLICATIONS

This application is based upon and claims the benefit of priority from prior Japanese Patent Application No. 2006-047754, filed Feb. 24, 2006, the entire contents of which are incorporated herein by reference.

BACKGROUND OF THE INVENTION

1. Field of the Invention

The present invention relates to a video surveillance system which collects video data produced by cameras through network so as to execute concentrated monitoring at a remote monitoring station.

2. Description of the Related Art

In recent years, a variety of surveillance systems have been proposed with increased demands for disaster prevention and security maintenance.

For example, there has been currently used a video surveillance system which executes the concentrated monitoring through communication system by collecting video data in real time by means of a plurality of cameras disposed at multiple positions in various plants, construction sites, urban streets and the like and transmitting the video data over an IP network.

A conventional system uses wide-area wired communication lines as a transmission medium for network suitable for real-time pictures. However, this system has a problem that if an attempt is made to expand the system in order to expand its monitoring area after the construction of the system is completed, it takes much time and expense to construct additional wired transmission line and further, the wired transmission line cannot be placed depending on geographical condition. Therefore, it has been difficult to expand the monitoring area.

On the other hand, although a wireless LAN network constituted of a plurality of wireless nodes has been widely used recently in place of the wired IP network, the wireless LAN network has a smaller bandwidth than the wired LAN network.

For this reason, some solutions about quality of services (QoS) for securing a bandwidth for each service in this wireless LAN network have been proposed. For example, a control method which pays attention to a packet arrival interval in distribution of resources in the wireless network has been proposed (see for example, Jpn. Pat. Appln. KOKAI Publication No. 2005-123887). However, this is expected for antenna control but not for video surveillance.

As a video surveillance system, an environmental monitoring system which relies on wireless communication through a base station has been proposed (see for example, Jpn. Pat. Appln. KOKAI Publication No. 2005-51412).

By using a multihop network (called an ad-hoc network depending on case) which is a network configuration automatically formed by distributed wireless nodes alone without necessity of the wired infrastructure or base station, the video surveillance system can be expanded at a low cost in a short time. Further, the construction of the network is enabled even in areas in which the wired transmission line cannot be placed by using the wireless transmission. Because the multihop network has no concept of high order and low order among the nodes, which is a feature thereof, freedom degree of the system to increase/decrease of the nodes is high.

However, the current network, which is built up based on 802.11b or the like which is wireless LAN standard, is not sufficient for real-time video data transmission requiring a wide bandwidth. Further, in the multihop network, the quantity of communication among nodes such as route control information for selection of suitable route increases so that the bandwidth for use in information transmission is smaller than the conventional wireless network. Therefore, the multihop wireless network using a wireless LAN has such a problem that if the quantity of communication for other services is large in traffic within the network, insufficient bandwidth is allocated to the video data required at top priority depending on the case.

BRIEF SUMMARY OF THE INVENTION

The present invention has been achieved to solve the above-described problem and aims at relaying video data based on the priority in the multihop network.

According to an aspect of the present invention, there is provided a video surveillance system wherein a monitoring station collects video data obtained by a monitoring camera. The system includes a multihop wireless network formed of a plurality of wireless nodes including a first wireless node having the monitoring camera, and a second wireless node having a gateway connected to the monitoring station. The system also includes a priority control device configured to control the wireless network so that transmission in a link between the first wireless node and the second wireless node is performed at a priority level contained in a priority information message. The transmission including transmitting a video data request from the monitoring station to the monitoring camera, or transmitting video data from the monitoring camera to the monitoring station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described.

[First Embodiment]

Figure 1:
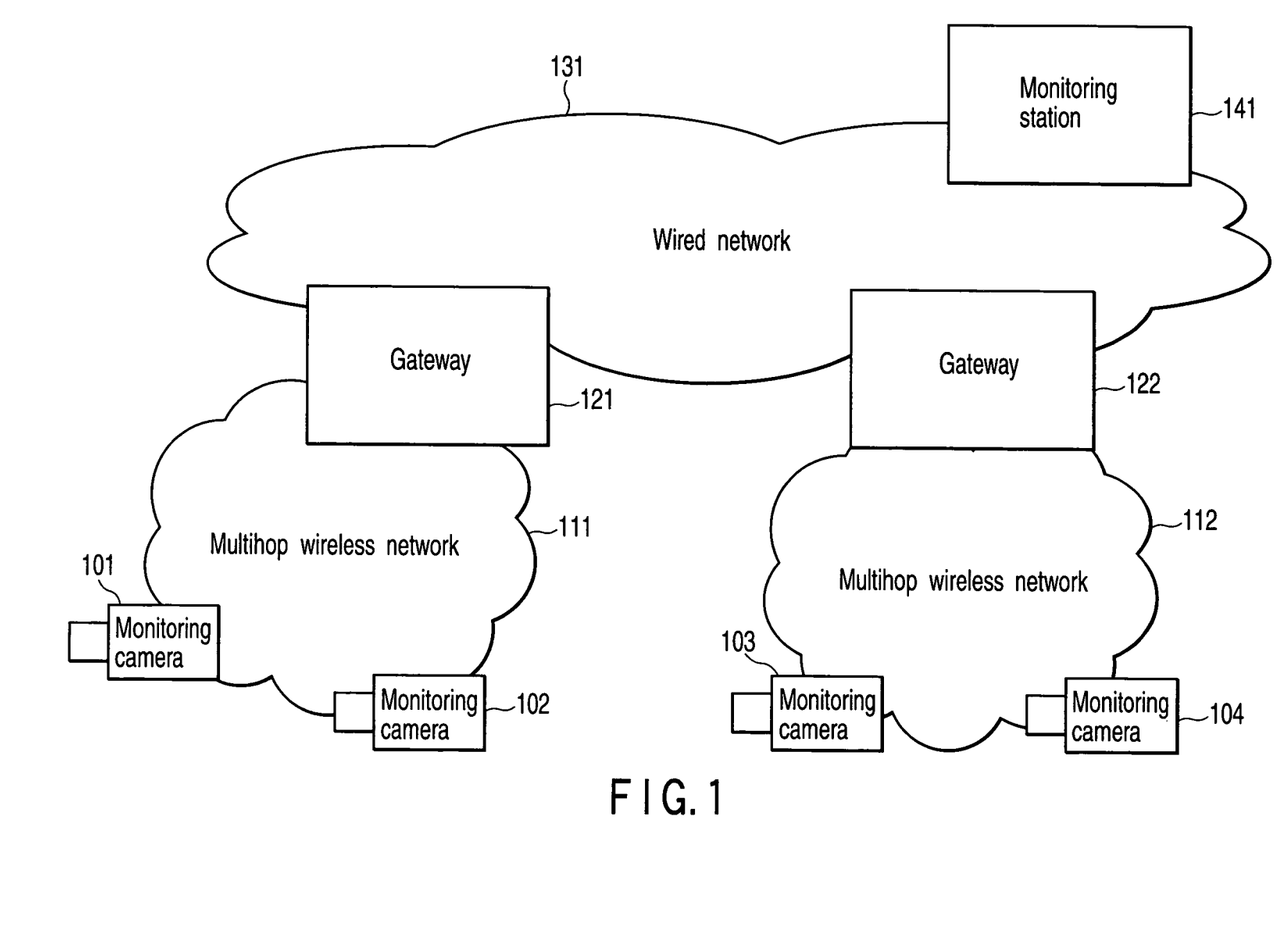
FIG. 1 is a basic configuration diagram of a video surveillance system according to a first embodiment of the present invention.

FIG. 1 is a basic configuration diagram of a video surveillance system of a first embodiment. Monitoring cameras 101, 102 are connected to a multihop wireless network 111 through an IP network interface. Monitoring cameras 103, 104 are similarly connected to a wireless network 112. The wireless networks 111, 112 are connected to a wired network 131 to which a monitoring station 141 belongs through gateways 121, 122 so that, consequently, the four monitoring cameras 101, 102, 103, 104 are connected to the monitoring station 141.

A basic procedure upon monitoring moving pictures obtained by the monitoring camera 101 by means of the monitoring station 141 will be described. The gateway includes database which makes correspondence between an IP address of a monitoring camera connected thereto and an identifier which specifies a particular camera from the multiple cameras on the system, and the monitoring station transmits an identifier of the monitoring camera 101 to each gateway.

Each gateway compares a received identifier with a correspondence database so as to confirm that the monitoring camera 101 is connected to the gateway 121 and its IP address. The gateway 121 specifies an IP address of the monitoring camera 101 and requests for transmission of moving picture data. After receiving the request for transmission, the monitoring camera 101 IP-packetizes the acquired moving picture data and sends the data to the gateway 121. The gateway 121 receives the moving picture data and transfers it to the monitoring station, so that acquisition of the moving picture by the monitoring station is completed. The acquired moving picture is displayed on a monitor provided in the monitoring station so as to achieve real-time monitoring. The acquired moving pictures are stored in a memory device such as hard disk together with IP address, identifier and time stamp of monitoring time of each monitoring camera and can be referred to later.

Figure 2:
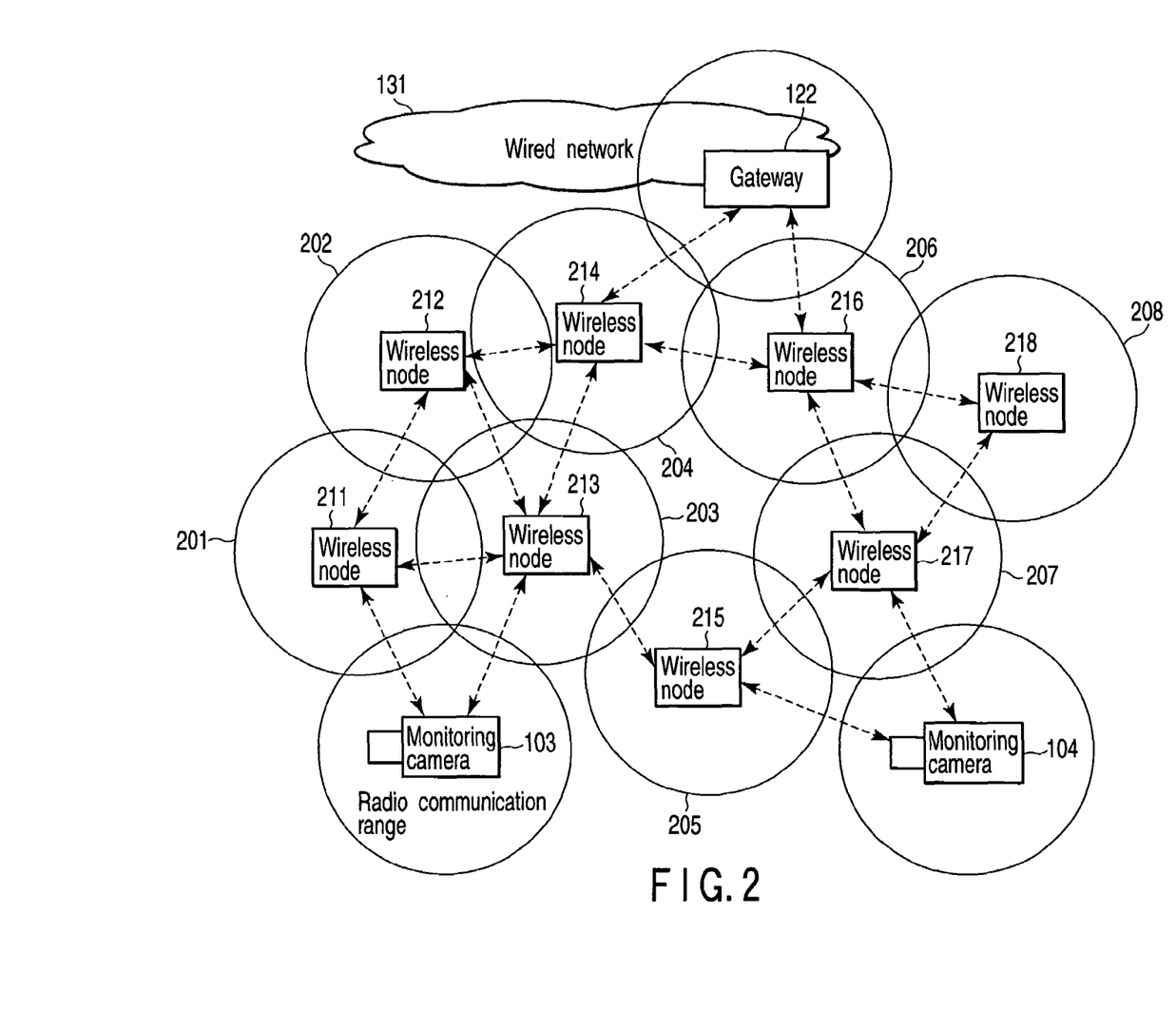
FIG. 2 is a configuration diagram of a multihop wireless network according to the first embodiment of the present invention.

FIG. 2 is a network configuration diagram of the multihop wireless network 112 of the first embodiment. The multihop wireless network 112 includes a plurality of wireless nodes 201 to 208 and the wireless nodes are disposed in a mesh-like formation in which radio arrival areas of the wireless nodes overlap so as to achieve communication among them. Overlapping portions of wireless communication ranges 211 to 218 in FIG. 2 indicate that communication between wireless nodes is enabled. In FIG. 2, a plurality of wireless nodes (not shown) exist so that the mesh-like collection of the respective node radio arrival areas about 50 m in radius forms a large wireless network. In the multihop wireless network, every node operates equivalently and independently unlike an infrastructure network including a base station (access point). Although a larger amount of calculations for routing is required as compared with the infrastructure network, this is different from a network configuration which has a plurality of child stations under the base station and if the base station is disabled to communicate, all the child stations become disabled to communicate, but can correspond more flexibly to addition of the wireless nodes with expansion of the monitoring area and reduction of the wireless nodes due to occurrence of faults.

The monitoring cameras 103, 104, the wireless nodes 201 to 208 and the gateway include each wireless LAN interface, and a radio channel (frequency) and a service set identifier (SSID) which is an identifier for the network are set in each wireless LAN interface. In this embodiment, communication based on IEEE 802.11g standard is executed for example. Naturally, as the standard of the wireless LAN, IEEE 802.11a, IEEE 802.11b and the like are also available.

Figure 3:
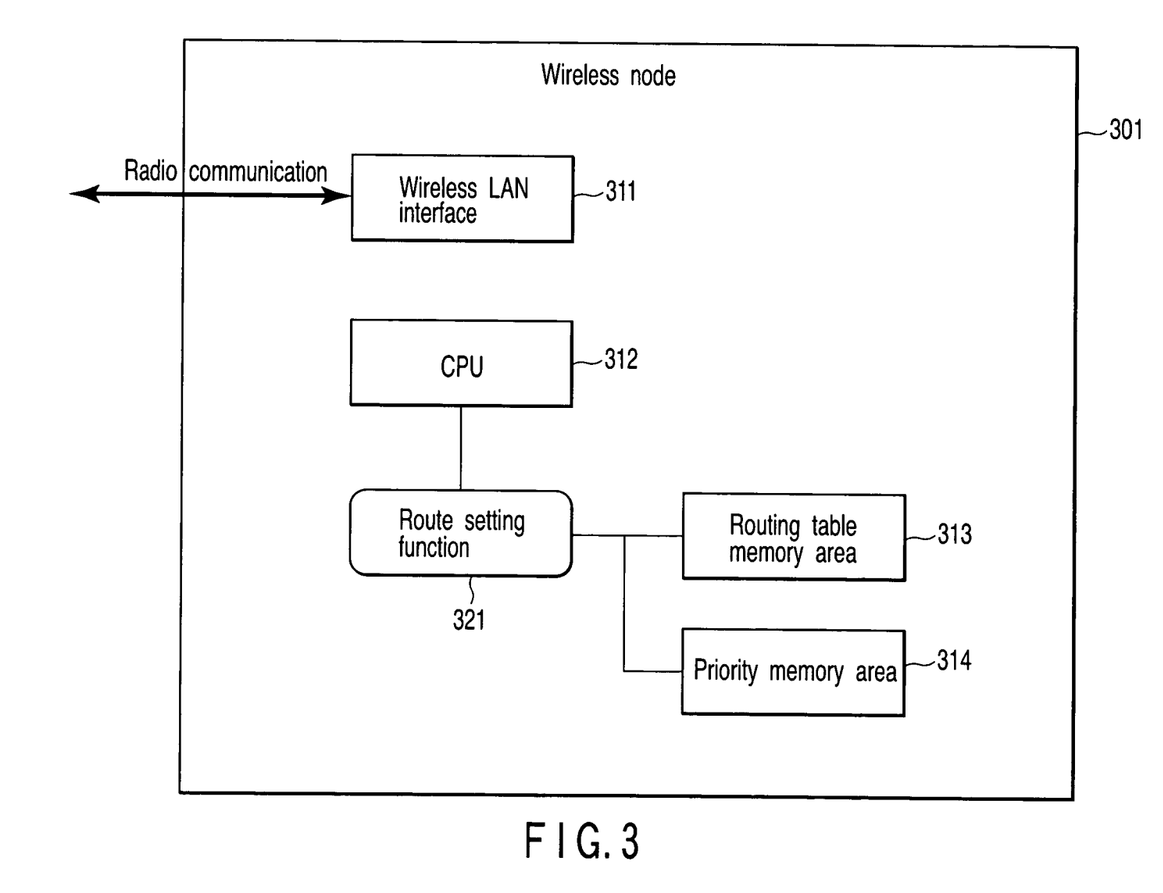
FIG. 3 is a function block diagram of a wireless node in the first embodiment of the present invention.

FIG. 3 is a function block diagram of the wireless node. A wireless node 301 includes a wireless LAN interface 311, a processor 312 which includes a routing setting function and executes control, a route table memory area 313 which is a memory unit such as RAM, and a priority memory area 314. A routing setting function 321 activates optimized link state routing (OLSR), which is a route control protocol. In the monitoring camera and the gateway which are wireless terminals, the OLSR protocol is actuated as a routing protocol as in the wireless node so that route establishment and route maintenance for the wireless network are carried out by periodic information exchange among the respective wireless terminals. The established route is stored in the route table memory area 313 and each node controls communication independently.

As the routing protocol, ad-hoc on-demand distance vector (AODV) protocol which has a feature in creating a route when communication request is received may be used.

The OLSR creates a route ahead of communication request different from the AODV. Thus, this is suitable for a case where the communication frequency is high and a change in network topology is small. In the video surveillance system, usually, any monitoring camera is always displayed and the monitoring camera is seldom moved even if a new monitoring camera can be provided. Thus, this embodiment uses the OLSR protocol.

Control information (moving picture data and transmission request) from the monitoring station is converted to control information within the wireless network by the gateway in which the routing protocol is activated and transmitted to a predetermined wireless terminal, that is, wireless node or monitoring camera through a route established by the routing protocol. Likewise, information (moving picture and the like) from the wireless terminal in the wireless network to the monitoring station is transmitted to the gateway through a route established by the routing protocol and then transmitted from the gateway to the monitoring station.

Figure 4:
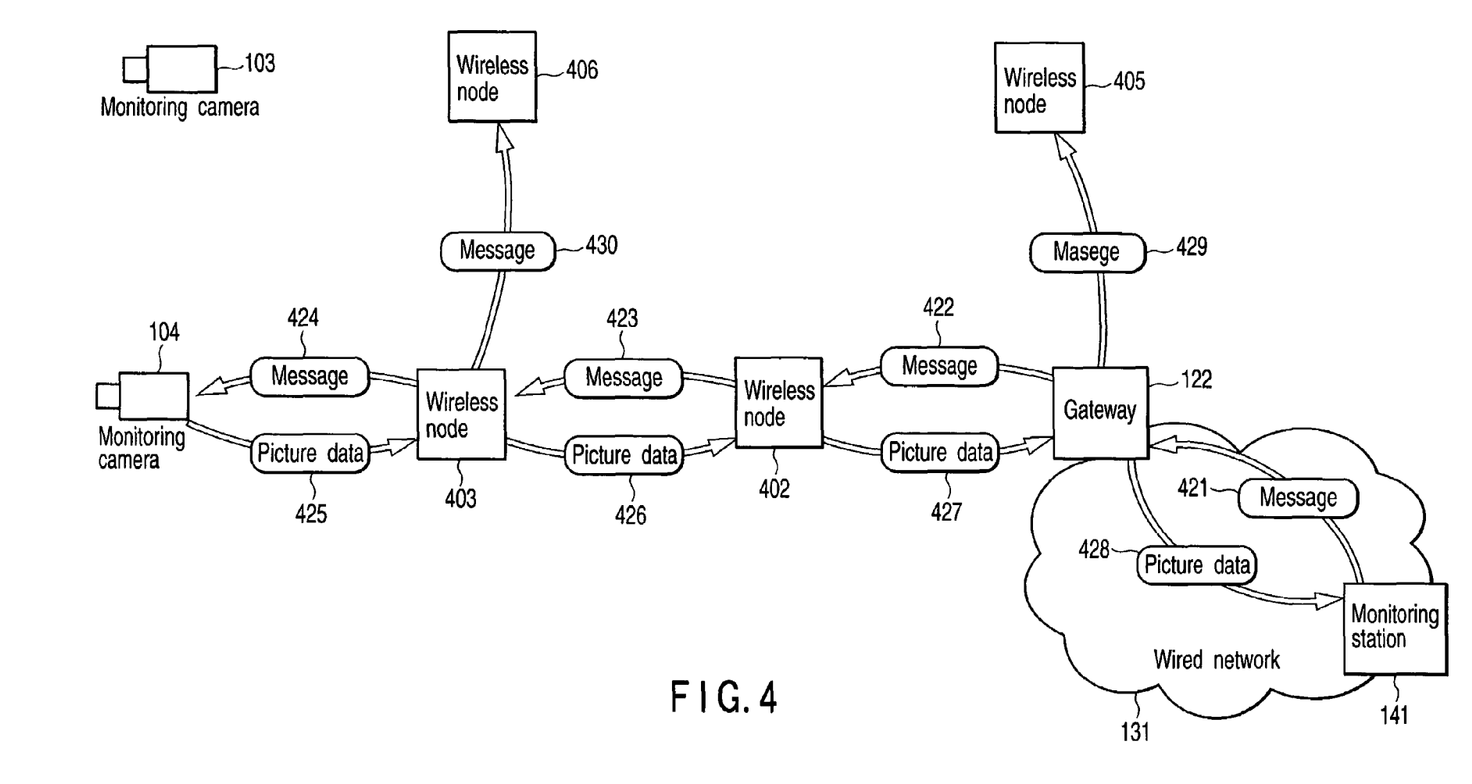
FIG. 4 is an operation diagram of a priority information transmission method in the first embodiment of the present invention.

A method of transmitting priority setting will be described with reference to the operation diagram of FIG. 4 about the priority information transmission method in the first embodiment. A route from the gateway 122 to the monitoring camera 104 in FIG. 4 showing part of the network is set to gateway 122→wireless node 402→wireless node 403→monitoring camera 104 by the routing protocol and a route from the monitoring camera 104 to the gateway 122 is set to a reverse course, that is, monitoring camera 104→wireless node 403→wireless node 402→gateway 122. The wireless nodes 405, 406 are nodes which are located adjacent to the wireless nodes 122, 403, respectively, within the radio arrival area. The monitoring station 141 and the gateway 122 are connected to each other by a wired network.

The priority is transferred to the gateway 122 as a message 421 containing the priority level on N stage (N is a natural number of 1 or larger) from the monitoring station 141 together with a video data request of the monitoring camera corresponding to the monitoring camera 104. As the priority level, N which is top priority is set up. Unless the priority setting is achieved, 1 which is a lowest level is set up as an initial value. The gateway 122 acquires an IP address of the monitoring camera 104 from the correspondence table between the previously set monitoring camera identifier and IP address and sends a message 422 containing the data request and the priority level with this IP address set as a sending destination and its own node, that is, the IP address of the gateway 122 set as a source.

The message 422 is transferred to the monitoring camera 104 as a sending destination through a set route. At this time, nodes on the route, that is, the gateway 122, the wireless nodes 402, 403 and the monitoring camera 104 acquire a source address, a sending destination address and priority information in the message and stores them in each priority memory area 314.

As described above, after receiving a request, the monitoring camera 104 sends video data with the IP address of the gateway 122 set as a sending destination and the IP address of that node set as a source. The video data is transferred to the gateway 122 through the set route and the gateway 122 which has received the video data transfers the video data to the monitoring station 141.

The content of the message 422 is also received by adjoining nodes 405, 406 located within the radio arrival area of the node on the transfer route as transferred messages 429, 430. Although these nodes do not transfer any request message because they are not located on the transfer route, the source address, sending destination address and priority information in the message are acquired like the node on the route and stored in that node. That is, the priority information is held by a node on the transfer route to the monitoring camera 104 from the gateway 122 and a node adjacent to each node on the route.

Next, a procedure for reflecting sent priority on the network will be described.

Because when the priority is reflected in the wired network, the band is ensured in the interface between the nodes, the receiving side can verify the priority set on each received data after receiving all data and achieve processing corresponding to the priority. However, because the wireless network cannot receive all data and does not know the priority until it is received even if the network attempts to receive data with priority, no priority processing can be carried out on the receiving side. To reflect the priority upon the wireless network, the sending side of the wireless station needs to send with the priority added unlike the wired network. Thus, in the wireless network, transmission and reception on which the priority is reflected relatively is carried out by restricting sending of data having a low priority to a node having a higher priority. The node in the wireless network refers to a correspondence table between the aforementioned holding data, namely, the route and priority level before data is transferred and adjusts the quantity of transmission if the priority level of the transmission destination of that node is high.

A case of sending non-video data from the node 406 to the monitoring camera 104 during monitoring in the first embodiment will be described. The node 406 checks the priority information and route correspondence table and verifies that the priority level of a link from the monitoring camera 104→wireless node 403→wireless node 402→the gateway 122 is N. The priority level of the non-video data route from the node 406→node 403→the monitoring camera 104 is set to 1 which is an initial value. The node 406 verifies that high priority level of N>1 is set in a sending route including the node 403 which is a sending destination of that node when transferring from the node 406 to the node 403 and sends by delaying sending of the non-video data in a predetermined period. Adjustment of the quantity of transmission can be achieved by restricting the bandwidth for communication of sending instead of delaying the transmission.

If a monitored picture is changed from the monitoring camera 104 to the different monitoring camera 103, the priority level on the route is reset by sending a message containing the priority level which is priority level 1 to the monitoring camera 104 without having any request message. Next, the gateway 122 sends a message containing data request and priority information in a route (not shown) to the monitoring camera 103. The transmission method of the priority setting in the monitoring camera 103 in a following process is the same as the case of the monitoring camera 104 and thus description thereof is omitted. Instead of changing the screen from picture of a certain monitoring camera to picture of different monitoring camera, it is permissible to set the level of resolution of pictures based on different N stage priorities levels set in each monitoring camera and display picture of a monitoring camera desired to be displayed by the monitoring station at a high resolution while displaying pictures of other monitoring cameras at a low resolution at the same time.

The first embodiment has a feature in setting the priority on a route from the monitoring station to the monitoring camera when the monitoring camera is selected and if the quantity of the relay wireless nodes on the route is large although the number of the monitoring cameras is small, can reduce the amount of communication relating to the priority setting on the network.

[Second Embodiment]

Figure 5:
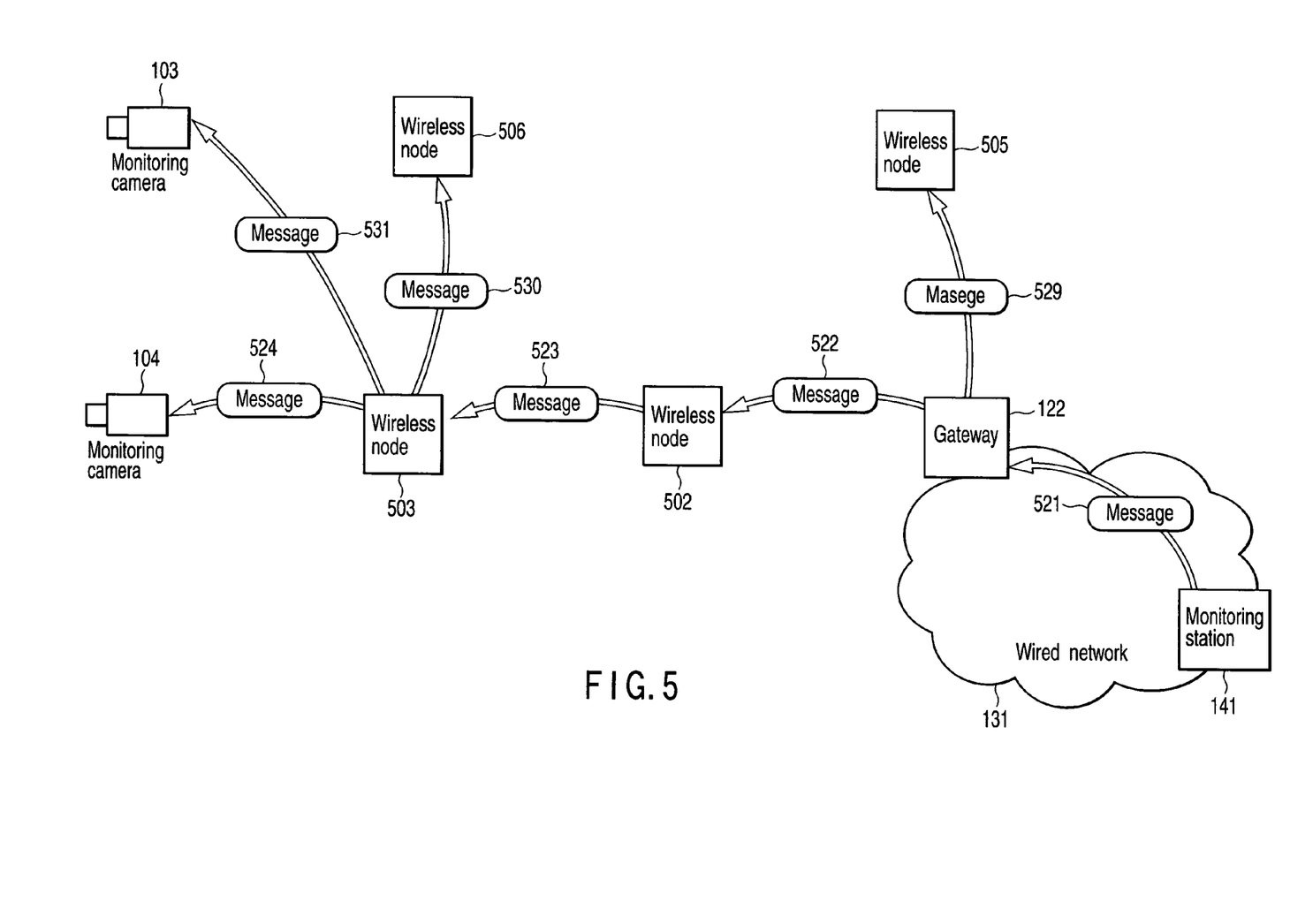
FIG. 5 is an operation diagram of a priority information transmission method in a second embodiment of the present invention.

FIG. 5 is an operation diagram of the priority information transmission method of a second embodiment. The second embodiment is different from the first embodiment only in the priority information transmission method and the same as the first embodiment in other operation and basic structure of the video surveillance system and therefore, description thereof is omitted.

If a message 521 containing video data request from a monitoring station 141 to a monitoring camera 104 and the priority information is sent to a gateway 122, the gateway 122 executes only the data request to the monitoring camera 104. At this time, the priority information message is sent together with a routing message to be transmitted/received periodically within the wireless network by a routing protocol. In the second embodiment, with the OLSR protocol, a message containing the priority information is sent at the same time with a topology control (TC) message for sending topology information of the entire network to all nodes belonging to the network. The OLSR protocol has a feature that it is suitable for transmission (broadcast) to all terminals connected to the network and capable of transmitting information to be shared in the network efficiently and rapidly.

All the terminals on the network of FIG. 5, that is, wireless nodes 502, 503, 505, 506, the monitoring cameras 104, 103 and the gateway 122 adjust the quantity of data transmission based on information obtained from a broadcasted message. When the monitoring camera is changed over or the network topology is changed, the message containing the changed priority information is sent to the TC message again so as to update the priority information on the network.

Figure 7:
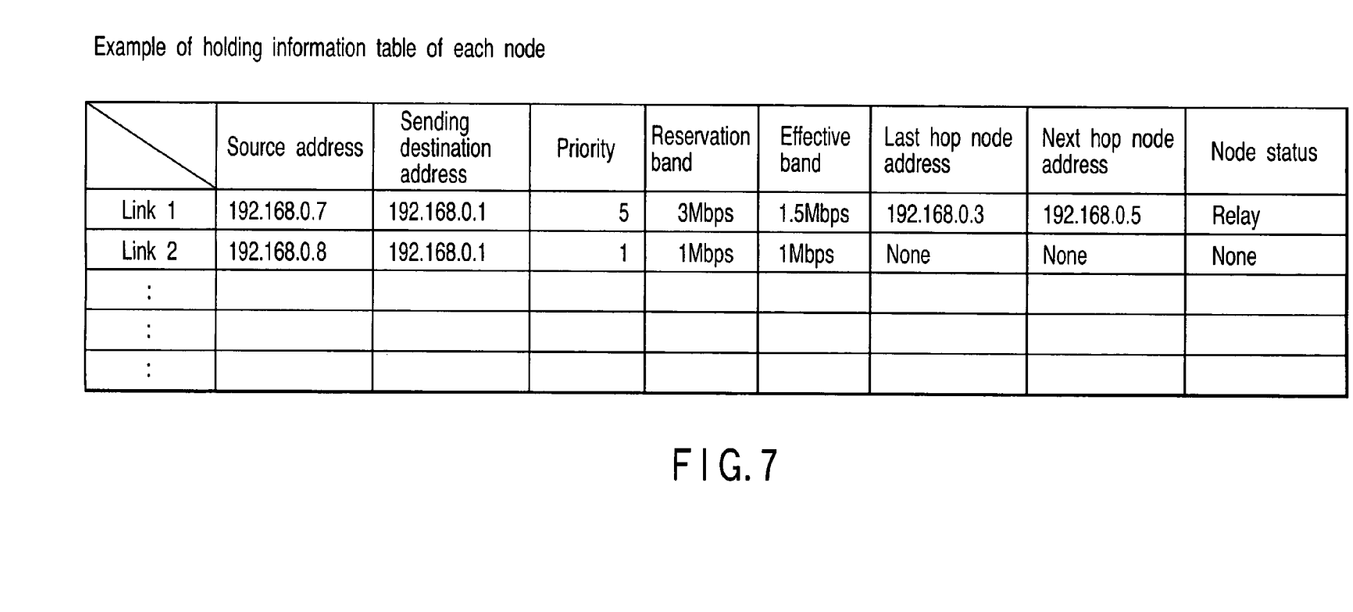
FIG. 7 is an example of a holding information table of each node in the second embodiment of the present invention.

FIG. 7 shows an example of holding information table in each wireless node of the second embodiment.

A table is created based on the positional relation of the node from the routing table and priority information. Each row corresponds to a link with a priority currently on communication. A source address, a sending destination address, a priority level, a reservation band, an effective band, a last hop node address, a next hop node address and a node status are recorded in each column.

The reservation band is a bandwidth of a link allocated based on the priority level. The effective band measures and records the quantity of actual communication with a wireless node which is a terminal. Because in this embodiment, the terminal node is a gateway, measurement and recording at the gateway are carried out. Which position the node belongs to with respect to the link is determined based on the routing information and if it is a relay point adjacent to the link or on the link, address of a node ahead by one is described in the last hop node address. An address of a next node is described in the next hop node address using the same method as for determining the last hop node address. The last hop node address and next hop node address both are empty if the given link and the node are not adjacent to each other or the node is not a relay point on the link. At which position the node is located with respect to the link, source, relay point, being adjacent and the like are described in the node status.

During transmission, each node in the network grasps a link with priority level relating to that node currently on communication by referring to the holding information table and restricts the quantity of communication about communication in other than a link in which the priority is set up. If the priority information on the network, effective band and the like are updated, these pieces of information are sent by broadcast and each node updates its own holding information table.

The node whose communication quantity is to be restricted can be confined to only a node adjacent to a link in which the priority is set so as to restrict the quantity of communication about communication carried out from other node without any limit. A load relating to the priority control on the network is reduced if the communication quantity of only adjacent nodes is restricted. However, if communication from other nodes passes through the adjacent nodes, packets exceeding the limit are aborted, so that the efficiency is lower as compared with a case of transmission by restricting from the beginning.

As other routing message, message containing the priority information can be sent together with HELLO message which is a message sent periodically in order to distribute information which each node possesses in the OLSR protocol. However, because the HELLO message is transmitted to only the adjacent nodes, the priority information cannot be shared by all the nodes on the network.

The second embodiment is suitable for a general video surveillance system which has no remarkable bias when the number of the relay wireless nodes on the route and the number of the monitoring cameras are compared.

[Third Embodiment]

Figure 6:
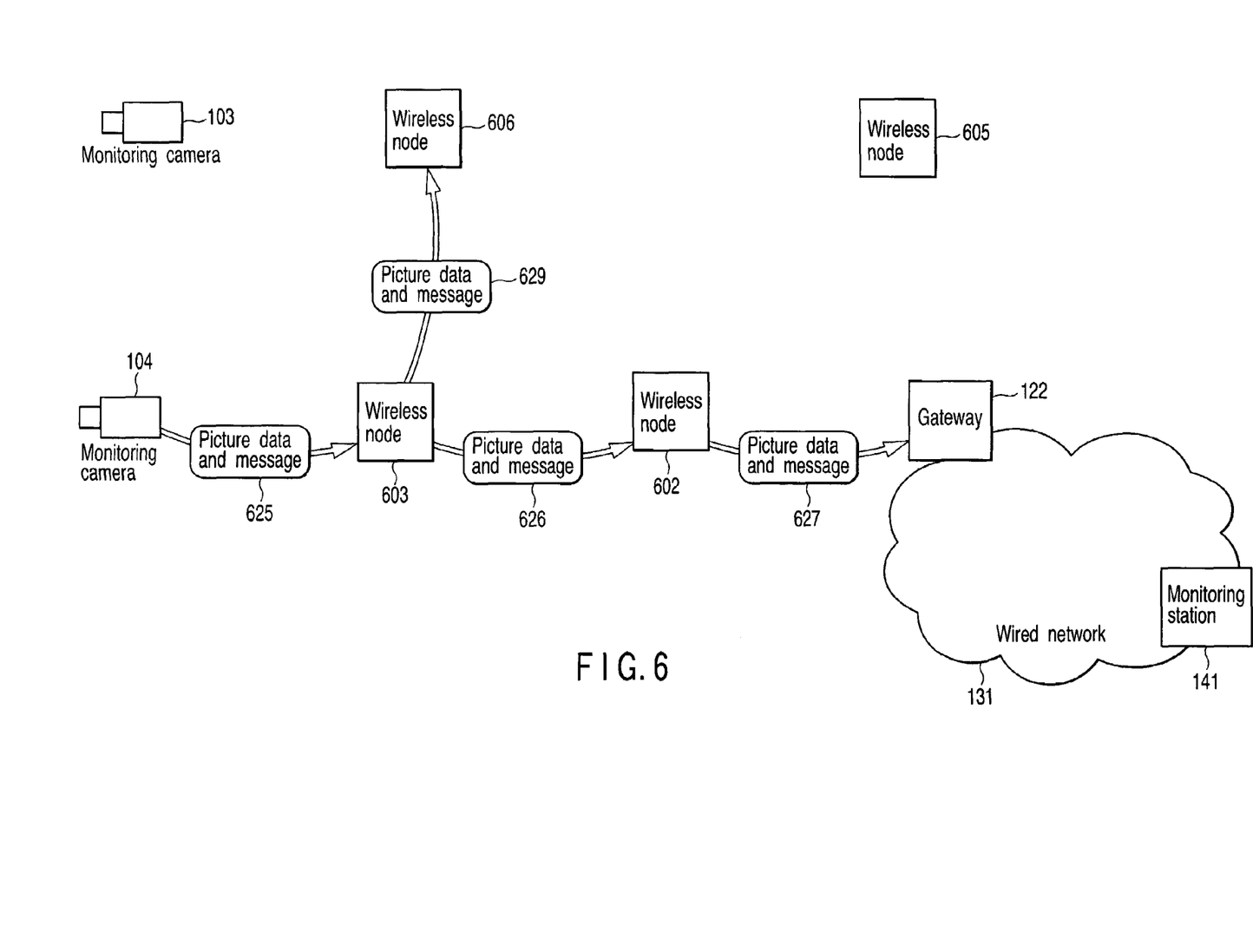
FIG. 6 is an operation diagram of a priority information transmission method in a third embodiment of the present invention.

FIG. 6 is an operation diagram of the priority information transmission method in a third embodiment. The third embodiment is different from the first embodiment only in the priority information transmission method and other operations and the basic structure of the video surveillance system are the same as the first embodiment and therefore, description 15, thereof is omitted.

Unlike from the first embodiment, the wireless node on the route does not refer to the priority information from a message containing the video data request and priority and hold it. A monitoring camera 104 which has received the message containing the video data request and priority through a gateway 122 from a monitoring station 141 sends out the message containing the priority information into an IP header together with the transmitted video data. Wireless nodes 602, 603 on the route for relaying video data and an adjacent wireless node 606 refer to the priority information from the packet containing the video data and holds it. The priority level may be generated by the monitoring camera itself so that the priority level of a selected monitoring camera is set to top level N without being provided from the monitoring station 141 when video data is sent. If a first packet, video data and messages 625, 626, 627 including the video data are relayed successively, the priority is set in the link and adjacent nodes and following packets containing the video data are transmitted with reflection of the priority.

Data to be sent from the monitoring camera 104 to the gateway 122 at the time of video data transmission is received as video data and a message 629 not only by nodes on the transmission route but also by a node 606 within a radio arrival area from nodes on the transmission route. Each wireless terminal which has received the message containing the video data and priority level holds obtained source address, sending destination address and priority level. Thus, the node 606 holds the source address, sending destination address and priority level. The node 606 recognizes existence of a link in which the priority level is set from the monitoring camera 104 to the gateway, refers to the previously held data and, if the data which the node should send is of low priority, restricts transmission thereof.

Because the priority information transmission method of this embodiment is carried out mainly by the monitoring cameras, it is suitable for a video surveillance system having a large number of monitoring cameras installed and a small number of relay wireless nodes on the route.

The present invention is not restricted to the above-described embodiments, but may be embodied by modifying its elements within a range not departing from the spirit of the invention on a carry-out stage. For example, upon resetting the priority by changing over the monitoring camera in the first embodiment, it is permissible to set the priority as mentioned in the first embodiment to the monitoring camera after the change-over by initializing all the priorities using the broadcast transmission mentioned in the second embodiment only at the time of change-over.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video surveillance system wherein a monitoring station collects video data obtained by a monitoring camera, comprising:

a multihop wireless network formed of a plurality of wireless nodes including a first wireless node having the monitoring camera, and a second wireless node having a gateway connected to the monitoring station, the plurality of wireless nodes being disposed so as to overlap wireless communication ranges of the plurality of wireless nodes, wherein at least one of the plurality of wireless nodes comprises:

a priority memory device that stores a priority level of link at which data is transmitted, a reservation band, and an effective band, wherein the data itself contains a priority level, wherein the reservation band is a bandwidth of a link allocated based on the priority level and the effective band is an amount of actual communication in the link;

a processor configured to control transmission of the data based on the priority level of link and the priority level contained in the data, referring to the priority memory device which stores the priority level of link so that transmission in the link between the first wireless node and the second wireless node is performed at the priority level contained in a priority information message from the monitoring station, the transmission including transmitting a video data request from the monitoring station to the monitoring camera, or transmitting video data from the monitoring camera to the monitoring station; and the processor further configured to measure an amount of actual communication in the link.

2. The system according to claim 1, wherein the at least one of the plurality of wireless nodes includes a transmission device configured to transmit the priority information message together with the video data request from the gateway.

3. The system according to claim 2, wherein the processor is further configured to restrict an amount of packet communication from wireless nodes which have received the priority information message to wireless nodes on the link.

4. The system according to claim 3, wherein the processor is further configured to restrict the amount of packet communication by delaying sending of packets in a predetermined period.

5. The system according to claim 3, wherein the processor is further configured to restrict the amount of packet communication by restricting a bandwidth for communication of sending.

6. The system according to claim 2, wherein the processor is further configured to restrict an amount of packet communication from wireless nodes adjacent to the link to wireless nodes on the link, when the wireless nodes adjacent to the link have received the priority information message.

7. The system according to claim 6, wherein the processor is further configured to restrict the amount of packet communication by delaying sending of packets in a predetermined period.

8. The system according to claim 6, wherein the processor is further configured to restrict the amount of packet communication by restricting a bandwidth for communication of sending.

9. The system according to claim 1, wherein the at least one of the plurality of wireless nodes includes a transmission device configured to transmit the priority information message contained in a routing message for performing route control for data transmission in the wireless network by a routing protocol.

10. The system according to claim 9, wherein the processor is further configured to restrict an amount of packet communication from wireless nodes which have received the priority information message to wireless nodes on the link.

11. The system according to claim 10, wherein the processor is further configured to restrict the amount of packet communication by delaying sending of packets in a predetermined period.

12. The system according to claim 10, wherein the processor is further configured to restrict the amount of packet communication by restricting a bandwidth for communication of sending.

13. The system according to claim 9, wherein the processor is further configured to restrict an amount of packet communication from wireless nodes adjacent to the link to wireless nodes on the link, when the wireless nodes adjacent to the link have received the priority information message.

14. The system according to claim 13, wherein the processor is further configured to restrict the amount of packet communication by delaying sending of packets in a predetermined period.

15. The system according to claim 13, wherein the processor is further configured to restrict the amount of packet communication by restricting a bandwidth for communication of sending.

16. The system according to claim 1, wherein the at least one of the plurality of wireless nodes includes a transmission device configured to transmit the priority information message together with the video data from the monitoring camera.

17. The system according to claim 16, wherein the processor is further configured to restrict an amount of packet communication from wireless nodes which have received the priority information message to wireless nodes on the link.

18. The system according to claim 17, wherein the processor is further configured to restrict the amount of packet communication by delaying sending of packets in a predetermined period.

19. The system according to claim 17, wherein the processor is further configured to restrict the amount of packet communication by restricting a bandwidth for communication of sending.

20. The system according to claim 16, wherein the processor is further configured to restrict an amount of packet communication from wireless nodes adjacent to the link to wireless nodes on the link, when the wireless nodes adjacent to the link have received the priority information message.

21. The system according to claim 20, wherein the processor is further configured to restrict the amount of packet communication by delaying sending of packets in a predetermined period.

22. The system according to claim 20, wherein the processor is further configured to restrict the amount of packet communication by restricting a bandwidth for communication of sending.

23. The system according to claim 1, wherein a routing protocol for performing route control for data transmission in the wireless network is an Optimized Link State Routing (OLSR) protocol.

* * * * *